United States Patent [19]
Maynard

[11] Patent Number: 5,355,617
[45] Date of Patent: Oct. 18, 1994

[54] MINNOW CONTAINER

[76] Inventor: Robert A. Maynard, R.R. #1, Cavan, Ontario L0A 1C0 CA, Canada

[21] Appl. No.: 40,846

[22] Filed: Mar. 31, 1993

[51] Int. Cl.$^5$ ............................................. A01K 97/04
[52] U.S. Cl. ..................................................... 43/56
[58] Field of Search ................... 43/55, 56; 261/121.2

[56] References Cited

U.S. PATENT DOCUMENTS

| | | | |
|---|---|---|---|
| 613,528 | 11/1898 | Richmond | 43/56 |
| 1,346,558 | 7/1920 | Rosenwasser | 43/55 |
| 1,897,571 | 2/1933 | Camporini | 43/56 |
| 2,007,326 | 7/1935 | Carpenter | 43/56 |
| 2,250,942 | 7/1941 | Allin | 43/56 |
| 2,538,462 | 1/1951 | Klatt | 43/56 |
| 3,044,209 | 7/1962 | Roach | 43/56 |
| 3,339,305 | 9/1967 | Smith | 43/56 |
| 3,726,039 | 4/1973 | Borrelli | 43/56 |
| 3,903,636 | 9/1975 | Bracey | 43/56 |
| 5,138,975 | 8/1992 | Walsh | 43/56 |

*Primary Examiner*—Kurt C. Rowan
*Attorney, Agent, or Firm*—Donald E. Hewson

[57] ABSTRACT

An improved minnow container that is adapted to carry water and oxygen therein when in an upright position is disclosed. The container comprises a water receiving and retaining chamber that is substantially open at its bottom end and has a first opening in the top thereof and an oxygen receiving and retaining chamber that is substantially open at its bottom end and is sealed above the open bottom end so as to preclude the escape of oxygen therefrom when the container is in its upright position. A barrier means physically separates the oxygen receiving and retaining chamber and the water receiving and retaining chamber so as to preclude the passage of fluid between the water receiving and retaining chamber and the oxygen receiving and retaining chamber. The barrier means terminates at a lower boundary in a passageway that is generally below the barrier means. The passageway connects the water receiving and retaining chamber in fluid communication with the oxygen receiving and retaining chamber. When the container is in use in its upright position, the oxygen receiving and retaining chamber contains oxygen, the passageway contains water, and the water receiving and retaining chamber contains water above the level of the passageway, and the oxygen is precluded from exiting the oxygen receiving and retaining chamber. The container is adapted to pass oxygen from the oxygen receiving and retaining chamber through the passageway and into the water receiving and retaining chamber, and concurrently to pass water from the water receiving and retaining chamber through the passageway and into the oxygen receiving and retaining chamber, when the container is rotated from its upright position to a fully rotated position, whereat the oxygen receiving and retaining chamber is substantially filled with water, which is held therein by ambient air pressure in the water receiving and retaining chamber. Oxygen is then added into the oxygen receiving and retaining chamber.

8 Claims, 4 Drawing Sheets

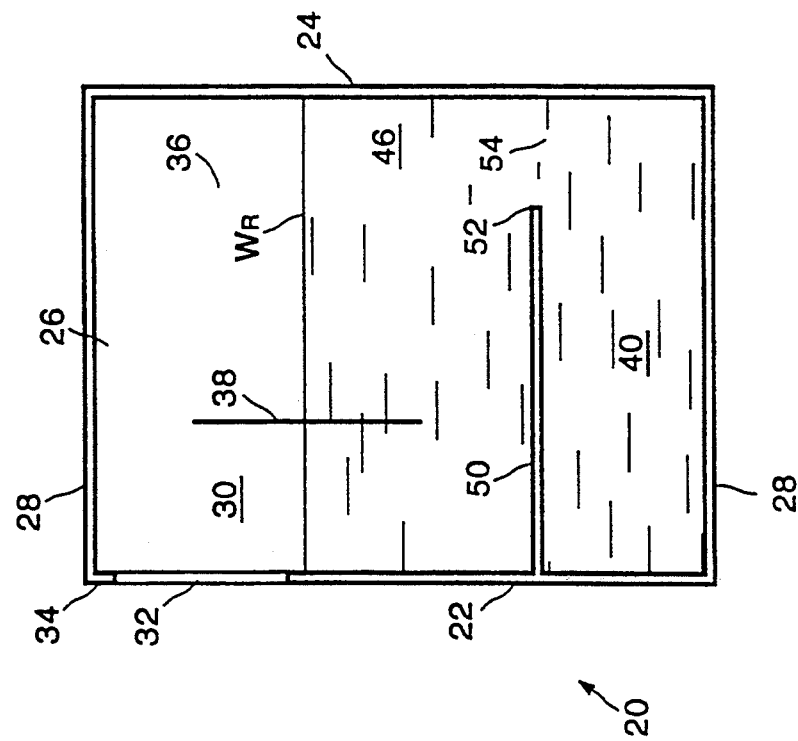
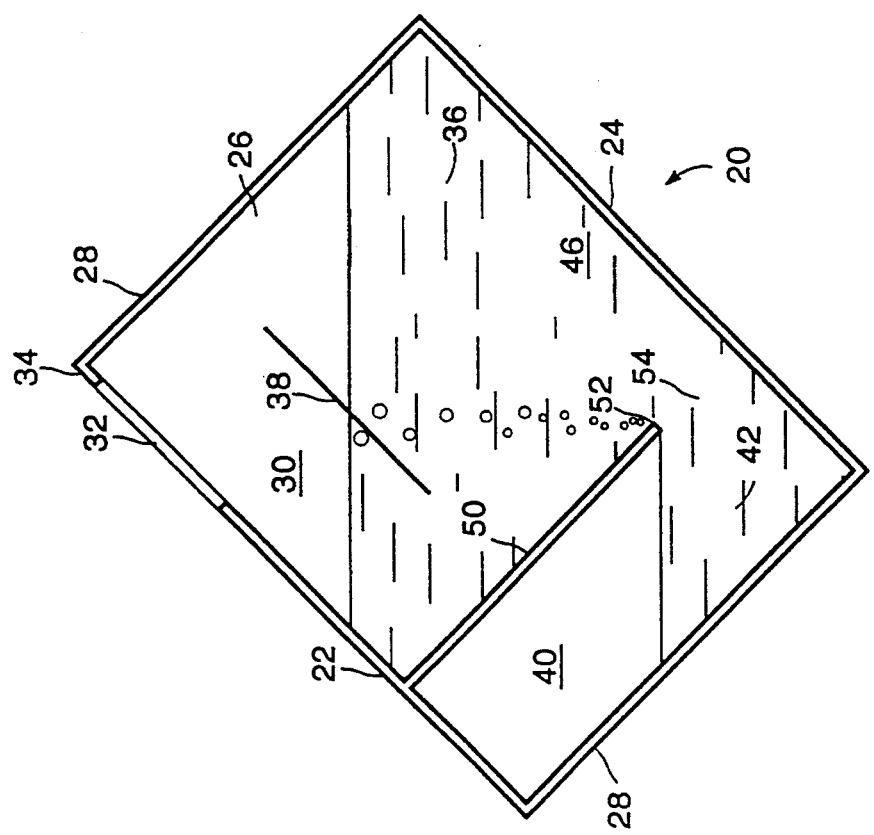
FIG 4
FIG 3

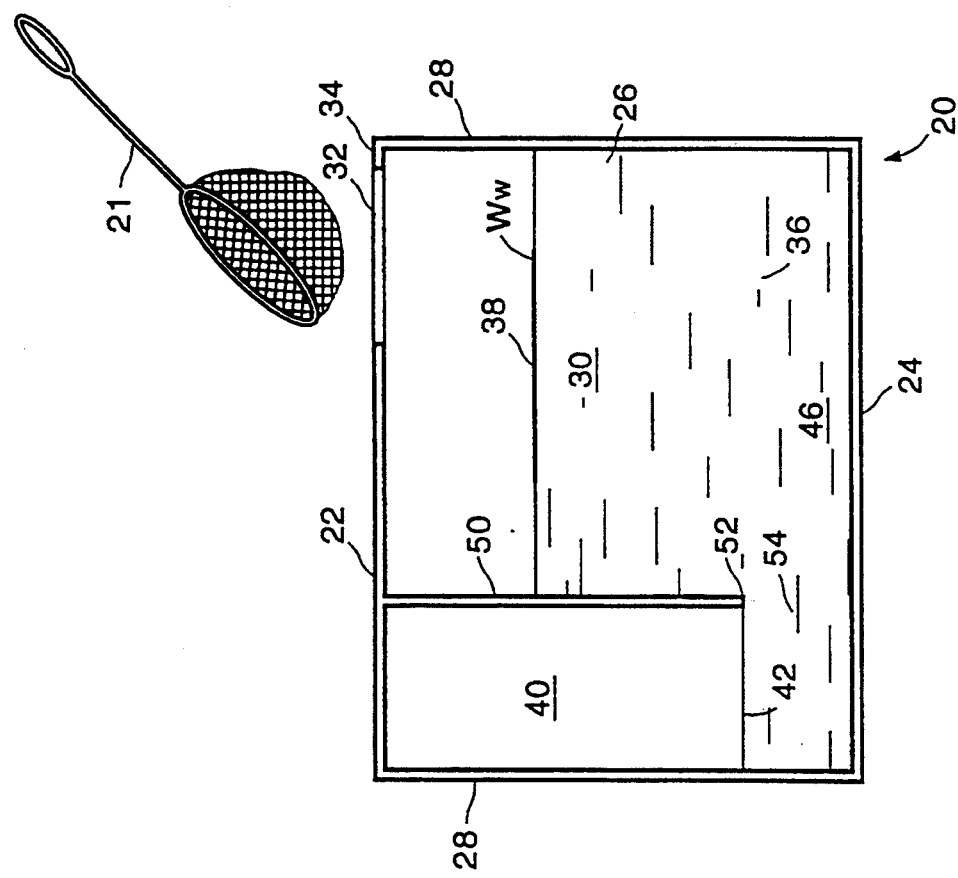
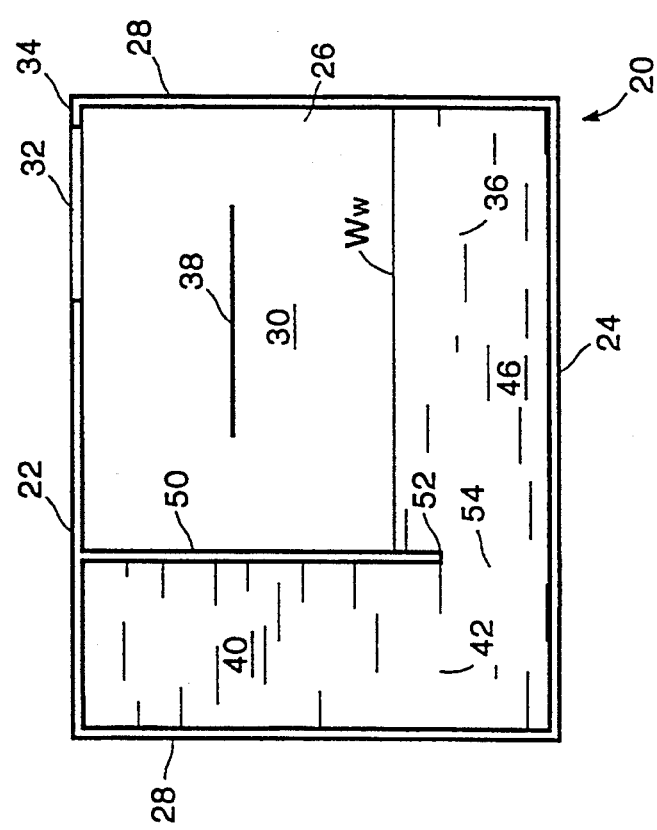
FIG 6
FIG 5

5,355,617

MINNOW CONTAINER

FIELD OF THE INVENTION

This invention relates to sport fishing and more particularly to equipment used to retain fish therein in an alive condition.

BACKGROUND OF THE INVENTION

Sport fishing is a very popular sport enjoyed by many millions of people. Typically, often as dictated by local laws, sport fishing involves the use of a device such as a fishing rod with a hook on the end of a fishing line as opposed to a large net that might be used in commercial fishing. In order to lure fish to the hook, either live bait, such as minnows or worms, is used, or alternatively artificial bait, such as a colourful metal and/or plastic lure is used. Many fisherman consider live bait to be superior over lures in attracting fish, especially in certain circumstances or for attracting particular fish. The main reasons for this is that the live bait moves within the water and is therefore more readily noticed by the fish, and moreover that the live bait being used is typically a natural food for fish.

The problem with live bait, however, is that it needs to be kept in a suitable environment in order survive, from the time of purchase until it is used on the fishing hook. In the case of minnows, the minnows must be kept in sufficiently oxygenated water for a period of perhaps several hours. Typically, minnows are purchased at a fishing supply outlet and must be transported to the fishing site, which may be several hours drive away. Further, the minnows must remain alive while at the fishing site, which could also cover a time period of several hours.

Presently, the most common form of receiving live minnows, if the minnows are to be transported a long distance, is a suitable plastic bag tied-off at the top and partially filled with water. At a large number of fishing supply outlets, a supply of oxygen ($O_2$) in the form of a cylinder with compressed $O_2$ therein, is pumped into the plastic bag in order to create a volume of gaseous oxygen above the water, thus providing a free oxygen supply for the minnows. The closed plastic bag is intended to preclude the oxygen from escaping. Once the oxygen that is dissolved in the water starts to run out, the minnows by instinct go to the surface of the water and start to gulp from the free oxygen supply in order to ingest the needed oxygen. Overall, it has been found that this above described manner allows minnows to live for many hours, depending on the number of minnows per given volume of water and so on. Unfortunately, as soon as the bag is unsealed and opened to the atmosphere, the free oxygen supply is no longer available to the minnows. The minnows must then rely on whatever oxygen must remain in the water or on a fresh supply of water.

What is needed is a way to keep a supply of oxygen available to the minnows without having to carry around a supplementary supply of compressed oxygen.

It is an object of the present invention to provide an improved minnow container that makes available a source of oxygen ($O_2$) to live minnows in water within the container.

It is another object of the present invention to provide a separate chamber member that allows an existing bucket, cooler, or other suitable carrying apparatus to be adapted into an improved minnow container that makes available a source of oxygen ($O_2$) to live minnows in water within the container.

PRIOR ART

Hitherto, minnow buckets have consisted of a pail having a perforated top to allow for the ingress of fresh water thereinto when suspended in a body of water. In a more sophisticated embodiment, the minnow bucket has an inner liner that is perforated around its perimeter. The inner liner is suspended in a body of water. In either case, the minnow bucket or the inner liner, as appropriate, must be taken out of the water in order to gain access to the minnows. In any event, this type of traditional minnow bucket does not solve the problem of providing oxygen to minnows during transport over land.

SUMMARY OF THE INVENTION

In accordance with one aspect of the present invention, there is disclosed an improved minnow container that is adapted to carry water and oxygen therein when in an upright position. The container comprises a water receiving and retaining chamber that is substantially open at its bottom end and has a first opening in the top thereof and an oxygen receiving and retaining chamber that is substantially open at its bottom end and is sealed above the open bottom end so as to preclude the escape of oxygen therefrom when the container is in its upright position. A barrier means physically separates the oxygen receiving and retaining chamber and the water receiving and retaining chamber so as to preclude the passage of fluid between the water receiving and retaining chamber and the oxygen receiving and retaining chamber. The barrier means terminates at a lower boundary in a passageway that is generally below the barrier means. The passageway connects the water receiving and retaining chamber in fluid communication with the oxygen receiving and retaining chamber. When the container is in use in its upright position, the oxygen receiving and retaining chamber contains oxygen, the passageway contains water, and the water receiving and retaining chamber contains water above the level of the passageway. The oxygen is precluded from exiting the oxygen receiving and retaining chamber since it is sealed above the level of its open bottom end. The container is adapted to pass air from the oxygen receiving and retaining chamber through the passageway and into the water receiving and retaining chamber, and concurrently to pass water from the water receiving and retaining chamber through the passageway and into the oxygen receiving and retaining chamber, when the container is rotated from its upright position to a fully rotated position, whereat the oxygen receiving and retaining chamber is substantially filled with water, which is held therein by ambient air pressure in the water receiving and retaining chamber. The container is then returned to its upright position and a supply of oxygen ($O_2$) is pumped into the oxygen receiving and retaining chamber.

In another aspect of the present invention there is disclosed a chamber member adapted for use in conjunction with a minnow bucket that has a water receiving and retaining chamber, to form an improved minnow container that is adapted to carry water and oxygen therein when in an upright position. The chamber member comprises a main body portion defining an oxygen receiving and retaining chamber that is substantially open at its bottom end. The main body portion is sealed above the open bottom end so as to preclude the escape of oxygen from the oxygen receiving and retaining chamber when the minnow bucket is in its upright position. A flange portion that is adapted to fit over the lip of the minnow bucket provides means to attach the chamber member to the minnow bucket such that the open bottom end is directed downwardly. The open bottom end of the oxygen receiving and retaining chamber is in fluid communication with the water receiving and retaining chamber of the minnow bucket. When the container is in use in its upright position, the oxygen receiving and retaining chamber contains oxygen and the water receiving and retaining chamber contains water above the level of the open bottom end of the oxygen receiving and retaining chamber, and the oxygen remains in the oxygen receiving and retaining chamber. The open bottom end of the oxygen receiving and retaining chamber is in fluid communication with the minnow bucket such that the container is thereby adapted to pass air from the oxygen receiving and retaining chamber into the water receiving and retaining chamber, and concurrently to pass water from the water receiving and retaining chamber into the oxygen receiving and retaining chamber, when the minnow bucket is rotated from its upright position to a fully rotated position, whereat the oxygen receiving and retaining chamber is substantially filled with water. The container is then returned to its upright position and a supply of oxygen ($O_2$) is pumped into the oxygen receiving and retaining chamber.

BRIEF DESCRIPTION OF THE DRAWINGS

Embodiments of the present invention will now be described by way of the accompanying drawings, in which:

FIG. 3 is a diagrammatic view of the minnow container of FIG. 1 in a partially rotated position with the air in the oxygen receiving and retaining chamber escaping into the water receiving and retaining chamber, and the water in the water receiving and retaining chamber and passageway starting to fill the oxygen receiving and retaining chamber;

FIG. 4 is a diagrammatic view of the minnow container of FIG. 1 in a fully rotated position with all of the air having escaped from the oxygen receiving and retaining chamber, which is now filled with water;

FIG. 5 is a diagrammatic view of the minnow container of FIG. 1 in an upright position with the oxygen receiving and retaining chamber filled with water;

FIG. 6 is a diagrammatic view of the minnow container of FIG. 1 in an upright position with the oxygen receiving and retaining chamber filled with oxygen ($O_2$);

DETAILED DESCRIPTION OF THE PREFERRED EMBODIMENTS

Figure 1:
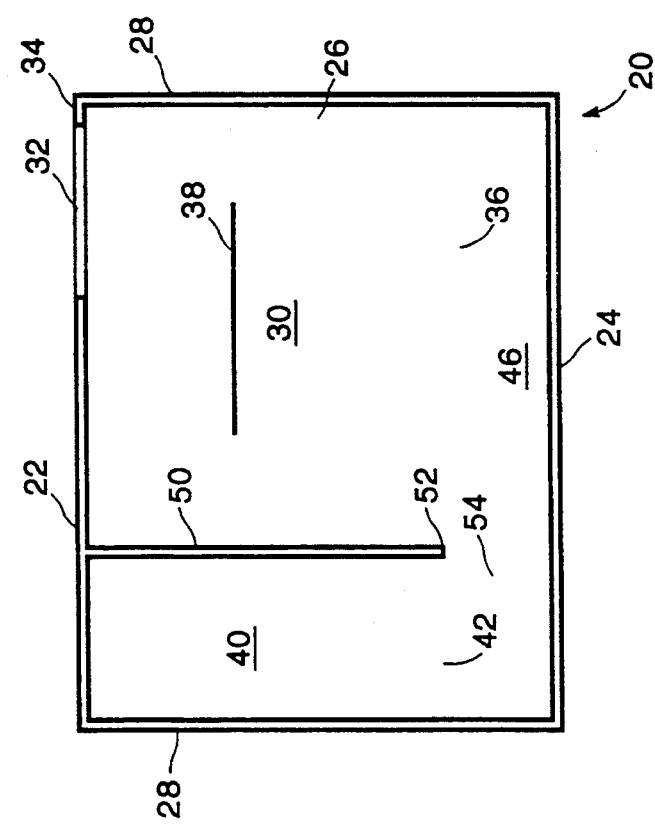
FIG. 1 is a diagrammatic view of the minnow container of the present invention in an upright position, without any water therein.

Reference will now be made to FIG. 1, which shows the preferred embodiment of the minnow container 20 of the present invention in an upright position as it would be when in sue carrying minnows. The minnow container 20 has a top 22, a bottom 24, a pair of sides 26, and a pair of ends 28, which are joined in sealed relation to one another, and is thereby adapted to carry water and oxygen therein, when in an upright position. The minnow container 20 comprises a water receiving and retaining chamber 30, an oxygen receiving and retaining chamber 40, and a transfer section 46.

The water receiving and retaining chamber 30 has a first opening 32 in the top 34 thereof. The first opening 32 may be selectively closed by a co-operating lid (not shown) if desired. The first opening 32 is preferably adapted to permit the passage of a minnow net 21 therethrough so as to facilitate easy deposit and removal of minnows into the minnow container 20. The water receiving and retaining chamber 30 is generally sealed so as to preclude the unwanted leaking of water therefrom and is substantially open at its bottom end 36 so as to allow for the flow of air, oxygen, and water into and out of the water receiving and retaining chamber 30 by way of the transfer section 46.

The oxygen receiving and retaining chamber 40 is also substantially open at its bottom end 42 and is sealed above the open bottom end 42 so as to preclude the leaking of water therefrom, and also to preclude the escape of oxygen therefrom when the minnow container 20 is in its upright position.

The volume of the water receiving and retaining chamber 30 is preferably considerably greater than the volume of the oxygen receiving and retaining chamber 40, but not necessarily so. In the preferred embodiment, the volume of the receiving and retaining chamber 30 is about three times that of the volume of the oxygen receiving and retaining chamber 40.

Immediately below the open bottom ends 36, 42 of the water receiving and retaining chamber 30 and the oxygen receiving and retaining chamber 40 is the transfer section 46. The transfer section 46 holds a portion of the water in the minnow container 20 during use, and allows for the transfer of water, air and oxygen between the oxygen receiving and retaining chamber 40 and the water receiving and retaining chamber 30.

Physically separating the oxygen receiving and retaining chamber from the water receiving and retaining chamber is a barrier means 50. In the preferred embodiment, the water receiving and retaining chamber 30 and the oxygen receiving and retaining chamber 40 are formed as one integral unit with the barrier means 50 being in the form of a separator partition therebetween. The barrier means 50 precludes the passage of fluid, including air, oxygen, and water, between the water receiving and retaining chamber 30 and the oxygen receiving and retaining chamber 40. The barrier means 50 terminates at its lower boundary 52 in a passageway 54 which is within the transfer section 46. The passageway 54 connects the water receiving and retaining chamber 30 in fluid communication with the oxygen receiving and retaining chamber 40, through the respective open bottom ends 36, 42 thereof and through the transfer section 46. The passageway 54 is generally below the barrier means 50 and extends between that lower boundary 52 of the barrier means 50 and the bottom 24 of the minnow container 20, and may be from about 2 cm high to about 10 cm high, as preferred or required. The lower boundary 52 of the barrier means 50 is generally straight and horizontal, in the preferred embodiment, when the minnow container 20 is in its upright position.

When the minnow container 20 is in use carrying minnows, and is therefore in its upright position, as shown in FIG. 6, the oxygen receiving and retaining chamber generally contains oxygen, the passageway 54 contains water, and the water receiving and retaining chamber 30 contains water above the level of the passageway 54—in other words above the most elevated portion of the lower boundary 52 of the barrier means 50. Further, there is air above the level "$W_w$" of the water in the water receiving and retaining chamber 30. The oxygen in the oxygen receiving and retaining chamber 40 is precluded from exiting the oxygen receiving and retaining chamber 40 because it is sealed by water above the level of the passageway, at the lower boundary 52 of the barrier means 50. The water in the transfer section 46 below the open bottom end 42 of the oxygen receiving and retaining chamber 40 and the water in the passageway 54 preclude the oxygen in the oxygen receiving and retaining chamber from exiting therefrom.

Figure 2:
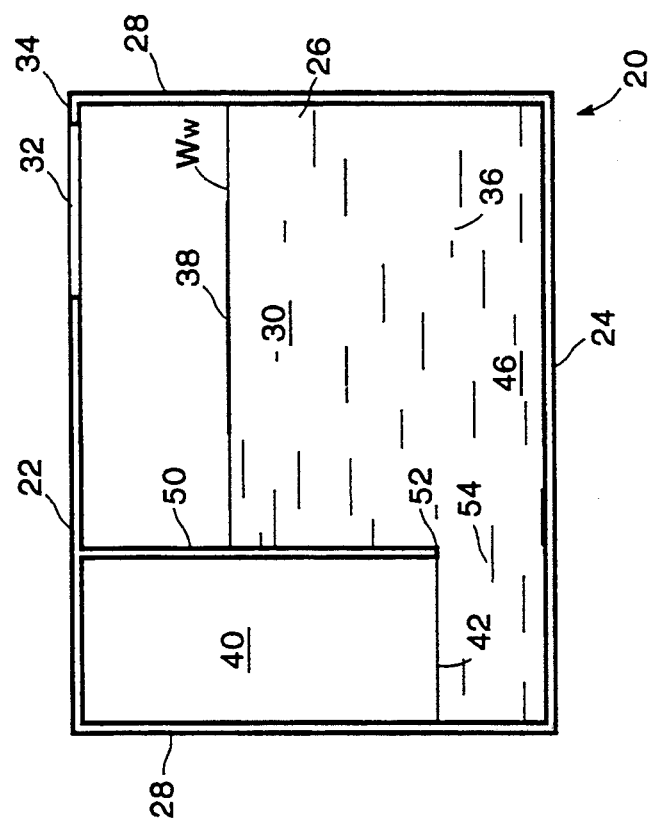
FIG. 2 is a diagrammatic view of the minnow container of FIG. 1 in an upright position, initially filled with water to a fill line.

Reference will now be made to FIGS. 2 through 6 to illustrate the use of the improved minnow container 20 of the present invention. In FIG. 2, an amount of water has been poured into the minnow container 20 through the first opening 32 in the top 34 of the water receiving and retaining chamber 30, up to the level of the fill line 38. The water fills the transfer section 46 under both of the water receiving and retaining chamber 30 and the oxygen receiving and retaining chamber 40 and also partially fills the water receiving and retaining chamber 30. The oxygen receiving and retaining chamber 40 remains filled with air.

As can be best seen in FIG. 3, the minnow container 20 is then rotated so as to allow the air within the oxygen receiving and retaining chamber 40 to escape therefrom and to be replaced by water from the transfer section 46 and the water receiving and retaining chamber 30. As the minnow container 20 is rotated, the air in the oxygen receiving and retaining chamber 40 passes through the passageway 54 into the water receiving and retaining chamber 30. Concurrently, water from the water receiving and retaining chamber 30 passes through the passageway 54 and into the oxygen receiving and retaining chamber 40. The minnow container 20 is rotated until it is in a fully rotated position, as shown in FIG. 4, with the oxygen receiving and retaining chamber 40 fully below the water receiving and retaining chamber 30. In the preferred embodiment as shown, the fully rotated position is about 90° offset to the upright position. In this fully rotated position, the oxygen receiving and retaining chamber 40 becomes filled with water and all of the air that was in the oxygen receiving and retaining chamber 40 escapes into the water receiving and retaining chamber 30. It can be seen that the water line "$W_r$" is just below the nearest portion of the first opening 32 in the top 34 of the water receiving and retaining chamber 30, which top 34 is now oriented sidewardly, thus precluding the water from flowing out of the first opening 32.

The minnow container 20 is then returned to its upright position, as shown in FIG. 5. In this position, the oxygen receiving and retaining chamber 40 remains filled with water since the oxygen receiving and retaining chamber 40 is sealed and there is no way for air to enter it in order to replace the water therein. Thus, the water is held therein by the ambient atmospheric pressure on the water in the water receiving and retaining chamber at water line "$W_w$".

The final step is filling the oxygen receiving and retaining chamber with a supply of oxygen ($O_2$) through use of a hose delivering the oxygen from a tank of compressed oxygen (not shown). Such tanks of compressed oxygen are typically available at any fishing supply outlet that supplies live minnows. A supply of oxygen is entered into the oxygen receiving and retaining chamber 40. It is not necessary to completely fill the oxygen receiving and retaining chamber 40; however, it is preferable since this provides a maximized amount of oxygen therein. Any excess oxygen that is pumped into the oxygen receiving and retaining chamber 40 beyond its full volume will merely escape as bubbles into the water receiving and retaining chamber and then into the ambient air above the water line "$W_w$".

In use, when the oxygen supply suspended in the water in the minnow container 20 runs low, the minnows will search for the surface of the water so as to gulp down air. Ultimately, the minnows will reach the surface of the water within the oxygen receiving and retaining chamber 40, where they will be able to gulp down pure oxygen. It has been found that by gulping down pure oxygen from above the surface of the water level, it is possible for minnows to survive virtually indefinitely. Such survival is not possible by the minnows gulping ambient air.

Figure 7:
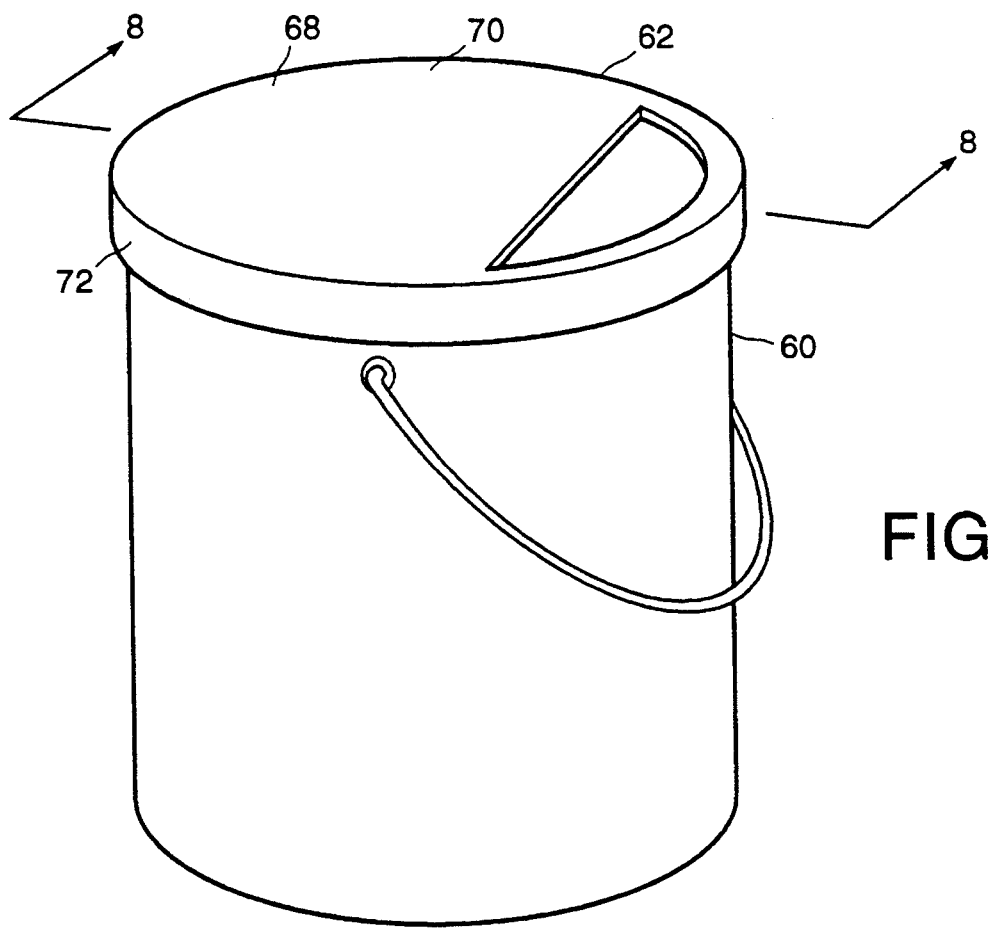
FIG. 7 is a perspective view of a typical minnow bucket having an alternative embodiment of the present invention installed therein.
Figure 8:
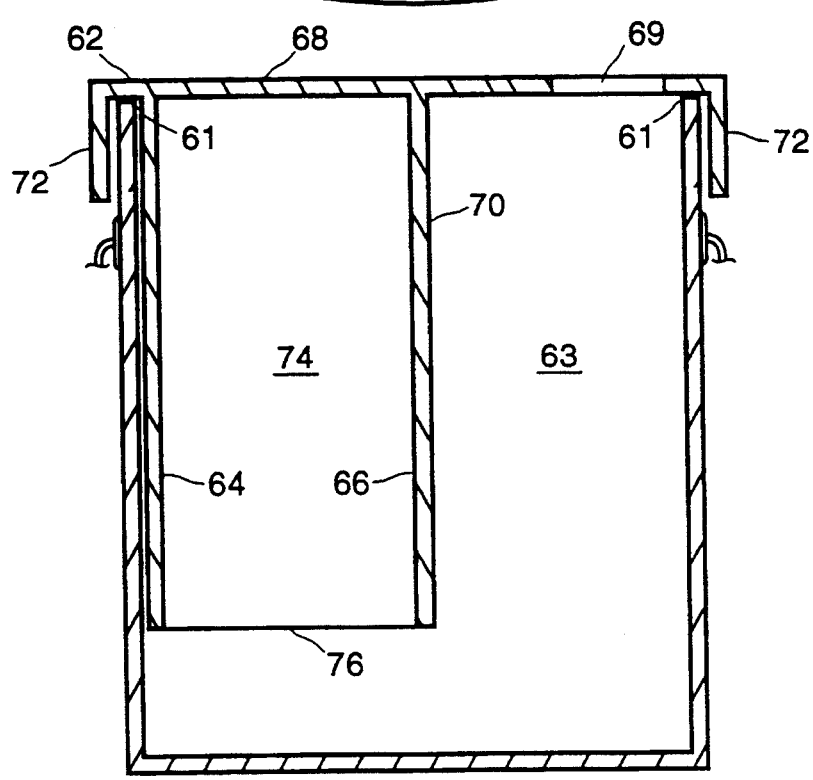
FIG. 8 is a sectional side view of the alternative embodiment of the present invention and the minnow bucket as shown in FIG. 8, along section lines 8—8.

Reference will now be made to FIGS. 7 and 8, which show an alternative embodiment of the present invention. A minnow bucket 60 has attached to it a chamber member 62 that is adapted for use in conjunction with the minnow bucket 60. The minnow bucket 60 has a water receiving and retaining chamber 63. Together, the minnow bucket 60 and the chamber member 62 form an improved minnow container that is adapted to carry water and oxygen therein when in use in an upright position.

The chamber member 62 comprises a main body portion that defines an oxygen receiving and retaining chamber 74. The main body portion 70 comprises a semi-circular first wall portion 64, a generally planar second wall portion 66, and a top portion 68, all joined together in sealed relation to form the main body portion 70. The oxygen receiving and retaining chamber 74 is substantially open at its bottom end 76, so as to allow the passage of fluids, including air, oxygen and water, into and out of the oxygen receiving and retaining chamber 74. The open bottom end 76 of the oxygen receiving and retaining chamber 74 is in fluid communication with the water receiving and retaining chamber 63.

There is also means to attach the chamber member 62 to the lip 61 of the minnow bucket 60 in the form of a flange portion 72 that extends outwardly and downwardly from the top portion 68 of the chamber member 62. The flange portion is adapted to fit over the lip 61 of the minnow bucket 60. There is a first opening 69 in the top portion 68 that allows access to the water receiving and retaining chamber 63 and also ultimately to the oxygen receiving and retaining chamber 74, for pumping oxygen thereinto. The first opening 69 is preferably adapted so as to allow the passage of a minnow net therethrough.

The chamber member 62 and the bucket 60 together form an improved minnow container, which functions and is used in a manner analogous to that described above, with reference to the preferred embodiment.

In a further alternative embodiment, it is contemplated that the oxygen receiving and retaining chamber has a valve in the top thereof that, when open, permits the entry of oxygen thereinto and that, when closed, precludes the escape of oxygen, air, and water therefrom.

Other modifications and alterations may be used in the design and manufacture of the Improved Minnow Container of the present invention without departing from the spirit and scope of the accompanying claims.

What is claimed is:

1. An improved minnow container that is adapted to carry water and oxygen therein when in an upright position, said container comprising:
   a water receiving and retaining chamber having a first opening in the top thereof;
   an oxygen receiving and retaining chamber that is substantially open at its bottom end and is sealed above said open bottom end so as to preclude the escape of oxygen therefrom when said container is in its upright position;
   wherein the volume of said water receiving and retaining chamber is greater than the volume of said oxygen receiving and retaining chamber;
   a barrier means physically separating said oxygen receiving and retaining chamber and said water receiving and retaining chamber, said barrier means terminating at a lower boundary in a passageway that connects said water receiving and retaining chamber in fluid communication with said oxygen receiving and retaining chamber, with said passageway being generally below said barrier means;
   wherein, when said container is rotated from its upright position to a fully rotated position, all of the air in said oxygen receiving and retaining chamber will pass through said passageway and into said water receiving and retaining chamber, and concurrently some water from said water receiving and retaining chamber will pass through said passageway and into said oxygen receiving and retaining chamber, whereby said oxygen receiving and retaining chamber is filled with water; and
   wherein, when said container is subsequently rotated form its fully rotated position to its upright position, said oxygen receiving and retaining chamber remains filled with water;
   so that said container is in use in its upright position, and when oxygen gas has been introduced into said oxygen receiving and retaining chamber after said container has been placed in its upright position, said oxygen receiving and retaining chamber contains oxygen gas, said passageway contains water, and said water receiving and retaining chamber contains water above the level of said passageway, and said oxygen gas is precluded from exiting said oxygen receiving and retaining chamber.

2. The improved minnow container 1, wherein said water receiving and retaining chamber is substantially open at its bottom end.

3. The minnow container of claim 1, wherein said water receiving and retaining chamber and said oxygen receiving and retaining chamber are formed as one integral unit with a separator partition therebetween.

4. The improved minnow container of claim 3, wherein said lower boundary of said barrier means is generally straight and horizontal when said minnow container is in its upright position.

5. The improved minnow container of claim 4, wherein said passageway is from about 2 cm high to about 10 cm high.

6. The improved minnow container of claim 5, wherein the volume of said water receiving and retaining chamber is substantially greater than the volume of said oxygen receiving and retaining chamber.

7. The improved minnow container of claim 6, wherein the volume of the water in the receiving and retaining chamber is about three times that of the volume of the oxygen receiving and retaining chamber.

8. The improved minnow container of claim 7, wherein said first opening is adapted to permit the passage of a minnow net therethrough.

* * * * *